US010110765B2

(12) United States Patent
Sei et al.

(10) Patent No.: US 10,110,765 B2
(45) Date of Patent: Oct. 23, 2018

(54) IMAGE FORMING APPARATUS, IMAGE FORMING SYSTEM, NON-TRANSITORY COMPUTER READABLE RECORDING MEDIUM ON WHICH PROGRAM IS RECORDED AND IMAGE FORMING METHOD

(71) Applicant: Konica Minolta, Inc., Chiyoda-ku, Tokyo (JP)

(72) Inventors: Ryou Sei, Hino (JP); Katsutoshi Sawada, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 4 days.

(21) Appl. No.: 15/345,073

(22) Filed: Nov. 7, 2016

(65) Prior Publication Data

US 2017/0134599 A1    May 11, 2017

(30) Foreign Application Priority Data

Nov. 10, 2015 (JP) .................................. 2015-220228

(51) Int. Cl.
H04N 1/00 (2006.01)

(52) U.S. Cl.
CPC ..... H04N 1/00896 (2013.01); H04N 1/00307 (2013.01); H04N 1/00891 (2013.01); H04N 1/00973 (2013.01); *H04N 2201/0075* (2013.01); *H04N 2201/0094* (2013.01)

(58) Field of Classification Search
CPC ........... H04N 1/00896; H04N 1/00891; H04N 1/00307; H04N 1/00973; H04N 2201/0075; H04N 2201/0094
See application file for complete search history.

(56) References Cited

U.S. PATENT DOCUMENTS 8,810,662 B2 * 8/2014 Okamoto .............. G06F 3/1204
348/207.1

FOREIGN PATENT DOCUMENTS

| JP | 2008-219351 A | | 9/2008 |
|---|---|---|---|
| JP | 2012088959 A | * | 5/2012 |
| JP | 2013008183 A | * | 1/2013 |
| JP | 2014-36356 A | | 2/2014 |

(Continued)

OTHER PUBLICATIONS

Office Action (Notification of Reasons for Refusal) dated Oct. 10, 2017, by the Japanese Patent Office in Japanese Patent Application No. 2015-220228, and an English Translation of the Office Action. (7 pages).

*Primary Examiner* — Kent Yip
(74) *Attorney, Agent, or Firm* — Buchanan Ingersoll & Rooney PC

(57) ABSTRACT

An image forming apparatus controls a display of an operation screen, receives an operation signal corresponding to first operation content through the operation screen, and performs a process based on the operation signal. The operation signal is generated based on second operation content through a display screen of imaging data which is imaged of the operation screen. The second operation content has operation item positional information and screen identification information. When performing the process, the first operation content is associated with the second operation content based on the operation item positional information and the screen identification information.

13 Claims, 7 Drawing Sheets

(56) References Cited

FOREIGN PATENT DOCUMENTS

| JP | 2014220772 A | 11/2014 |
| JP | 2015-15004 A | 1/2015 |

\* cited by examiner

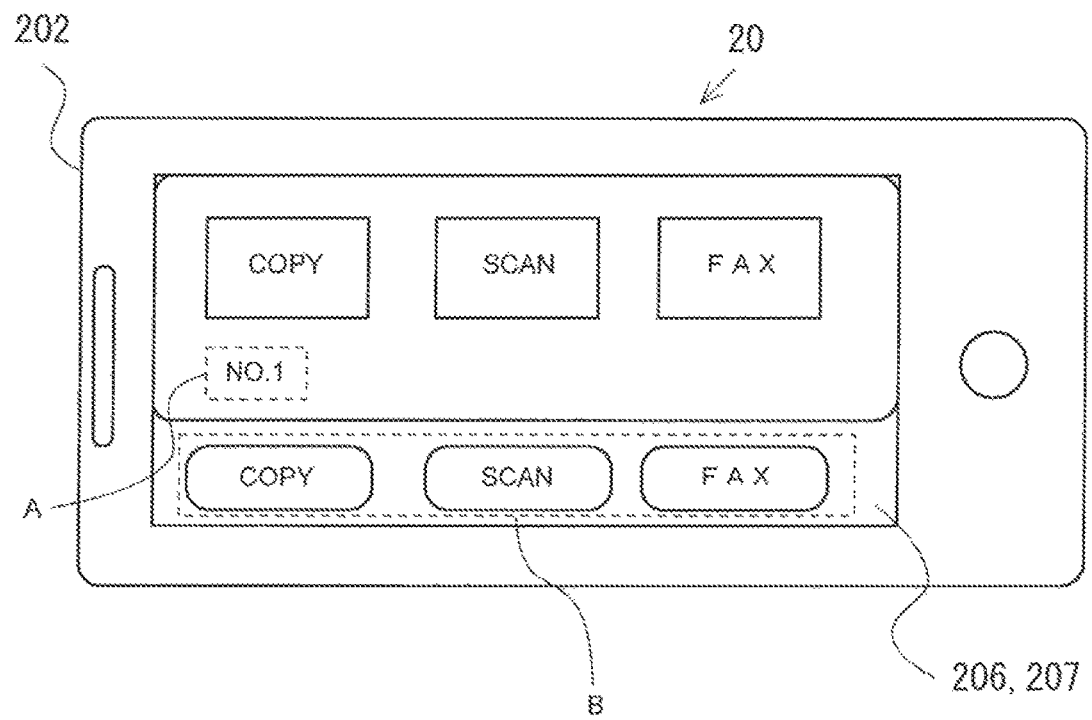

IMAGE FORMING APPARATUS, IMAGE FORMING SYSTEM, NON-TRANSITORY COMPUTER READABLE RECORDING MEDIUM ON WHICH PROGRAM IS RECORDED AND IMAGE FORMING METHOD

CROSS-REFERENCE TO RELATED APPLICATIONS

The present application claims priority under 35 U.S.C. § 119 to Japanese Patent Application No. P2015-220228, filed Nov. 10, 2015. The contents of this application are herein incorporated by reference in their entirety.

BACKGROUND OF THE INVENTION

Field of Invention

The present invention relates to an image forming apparatus, an image forming system, a non-transitory computer readable recording medium on which a program is recorded, and an image forming method.

Description of Related Art

In recent years, the functionality of an MFP (Multi-Functional Peripheral) becomes complicated while operation screens and operation items are very diverse. On the other hand, while the functionality of information terminals carried and used by individuals also becomes complicated, the information terminals are more frequently operated as compared with MFPs so that the acquisition of operation procedures does not accompany substantial difficulties even if the required procedures are complicated.

On the other hand, some technique has been developed which utilizes such an information terminal to remotely control an MFP (for example, refer to Japanese Patent Published Application No. 2008-219351). Also, another technique has been developed which utilizes the functionality of an imaging device incorporated in an information terminal to easily set an MFP in a state which was manipulated in the past (for example, refer to Japanese Patent Published Application No. 2014-36356).

In the case of the prior art technique as described in Japanese Patent Published Application No. 2008-219351, when remotely controlling an MFP as an image forming apparatus with an information terminal, the image forming apparatus provides the information terminal with an operation screen through communication. Accordingly, while the information terminal remotely controls the MFP, the MFP has to maintain the communication.

On the other hand, in the case of the prior art technique as described in Japanese Patent Published Application No. 2014-36356, the notification of imaging an operation screen is transmitted to an MFP which then saves operation content relating to the operation screen at this time, so that if a past operation screen is selected through an information terminal, the current settings of the MFP can be switched to the past settings. Accordingly, in order to set the MFP to the state manipulated in the past, communication with the MFP is required each time the operation screen is imaged.

Thus, in the case of the prior art techniques described in Japanese Patent Published Application No. 2008-219351 and Japanese Patent Published Application No. 2014-36356, when remotely controlling an MFP, the information terminal has to frequently communicate with the MFP so that the power consumption may not be saved during the remote control.

The present invention is made in order to solve such a prior art problem and it is an object of the present invention to provide an image forming apparatus, an image forming system, a non-transitory computer readable recording medium on which a program is recorded, and an image forming method, which can save power consumption during remote control.

SUMMARY OF THE INVENTION

To achieve at least one of the above-mentioned objects, reflecting first aspect of the present invention, an image forming apparatus comprises an image forming unit that forms an image; and a processor configured to execute processes including: controlling a display of an operation screen for accepting operation of a process relating to an image; receiving an operation signal corresponding to first operation content which can be operated through the operation screen which is display controlled; and performing a process relating to the image based on the operation signal, wherein the operation signal is generated based on second operation content operated through a display screen of imaging data which is imaged of the operation screen, the second operation content includes operation item positional information which associates a first operation item of the operation screen with a second operation item of the display screen, and screen identification information which associates the operation screen with the display screen, and when performing the process relating to the image, the processor associates the first operation content with the second operation content based on the operation item positional information and the screen identification information in response to reception of the operation signal.

In accordance with the image forming apparatus of the present invention, it is preferred that the screen identification information is contained in the operation screen and the display screen respectively, or generated based on the imaging time of imaging data and the displaying time of the operation screen.

Also, in accordance with the image forming apparatus of the present invention, it is preferred that the operation item positional information is generated based on coordinate information of the second operation item.

Furthermore, in accordance with the image forming apparatus of the present invention, it is preferred that the operation item positional information is corrected in accordance with a misalignment amount between the display screen and the operation screen.

Still further, in accordance with the image forming apparatus of the present invention, it is preferred that the misalignment amount is obtained based on a view angle when imaging the operation screen.

Still further, in accordance with the image forming apparatus of the present invention, it is preferred that the misalignment amount is obtained based on coordinate information of the first operation items and the coordinate information of the second operation items with reference to contour information of the operation screen.

Still further, in accordance with the image forming apparatus of the present invention, it is preferred that when misalignment occurs due to the imaging magnification of the operation screen, the misalignment amount is corrected based on this imaging magnification, and when misalignment occurs due to the displaying magnification of the display screen, the misalignment amount is corrected based on this displaying magnification.

Still further, in accordance with the image forming apparatus of the present invention, it is preferred that when the display screen includes an image of a hardware key and the second operation content corresponds to the hardware key, the processor performs the process of an image corresponding to the hardware key.

Still further, in accordance with the image forming apparatus of the present invention, it is preferred that when the operation screen is switched from a first setting screen to a second setting screen, the second operation content includes a series of the operation item positional information and the screen identification information obtainable while the first setting screen is switched to the second setting screen.

Still further, in accordance with the image forming apparatus of the present invention, it is preferred that the processor further controls electric power required for displaying the operation screen and switches the power supply state for displaying the operation screen from a normal state to a stand-by state when the operation screen is imaged.

To achieve at least one of the above-mentioned objects, reflecting first aspect of the present invention, an image forming method comprises controlling a display of an operation screen for accepting operation of a process relating to an image; receiving an operation signal corresponding to first operation content which can be operated through the operation screen which is display controlled; and performing a process relating to the image based on the operation signal, wherein the operation signal is generated based on second operation content operated through a display screen of imaging data which is imaged of the operation screen, the second operation content includes operation item positional information which associates a first operation item of the operation screen with a second operation item of the display screen, and screen identification information which associates the operation screen with the display screen, and when performing the process relating to the image, associating the first operation content with the second operation content based on the operation item positional information and the screen identification information in response to reception of the operation signal.

To achieve at least one of the above-mentioned objects, reflecting second aspect of the present invention, an image forming system comprises the image forming apparatus; and an information terminal, wherein the information terminal comprises: an imaging device configured to image the operation screen; a display configured to display the display screen based on the operation screen; an operation device configured to accept the second operation content of the display screen displayed on the display; and a terminal side interface configured to transmit the operation signal which is generated based on the second operation content.

To achieve at least one of the above-mentioned objects, reflecting third aspect of the present invention, a non-transitory computer readable medium on which is recorded a program which makes a computer perform: controlling a display of an operation screen for accepting operation of a process relating to an image; receiving an operation signal corresponding to first operation content which can be operated through the operation screen which is display controlled; and performing a process relating to the image based on the operation signal, wherein the operation signal is generated based on second operation content operated through a display screen of imaging data which is imaged of the operation screen, the second operation content includes operation item positional information which associates a first operation item of the operation screen with a second operation item of the display screen, and screen identification information which associates the operation screen with the display screen, and when performing the process relating to the image, associating the first operation content with the second operation content based on the operation item positional information and the screen identification information in response to reception of the operation signal.

BRIEF DESCRIPTION OF THE DRAWINGS

FIG. 11 is a view for showing an example of the display screen displayed on the display unit 206 of the information terminal 20 and including items corresponding to hardware keys B.

DETAILED DESCRIPTION OF THE PREFERRED EMBODIMENT

In what follows, an embodiment of the present invention will be explained with reference to drawings. However, the present invention is not limited to the following specific embodiment.

Figure 1:
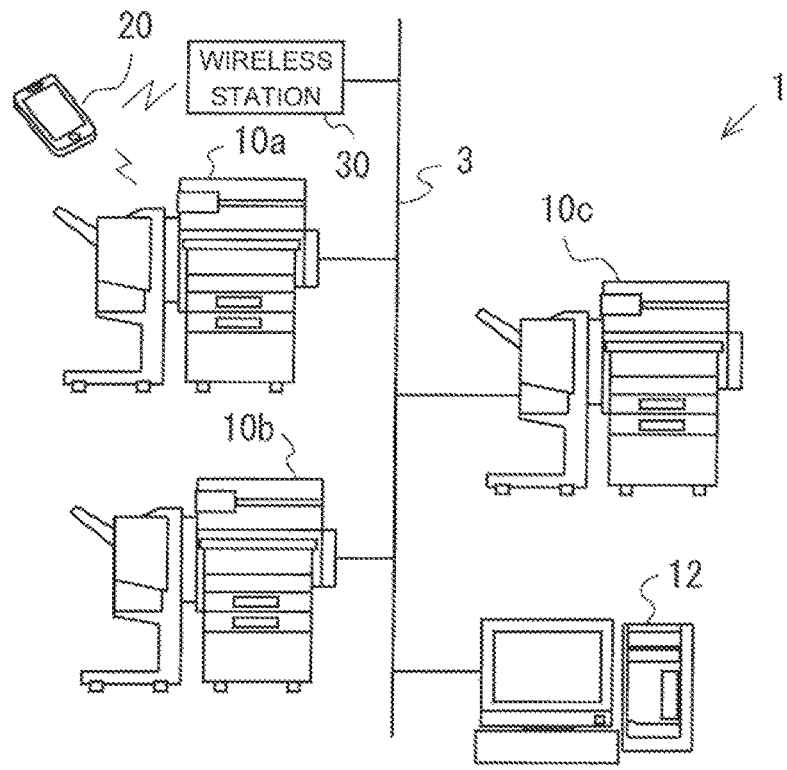
FIG. 1 is a schematic diagram for showing the overall configuration of an image forming system 1 in accordance with an embodiment.

FIG. 1 is a schematic diagram for showing the overall configuration of an image forming system 1 in accordance with the embodiment. As shown in FIG. 1, the image forming system 1 includes MFPs (Multi-Functional Peripherals) 10a to 10c and an information terminal 20, which are connected to a communication medium 3 respectively. The image forming system 1 also includes a personal computer 12 and a wireless station 30, which are connected to a communication medium 3 respectively.

Various driver programs for controlling the MFPs 10a to 10c are installed in the personal computer 12. Incidentally, in the case where the MFPs 10a to 10c are of different types, three types of the driver programs are installed in the personal computer 12 for controlling the MFPs 10a to 10c respectively.

Each of the MFPs 10a to 10c is implemented with an original reading function to read originals, an image formation function to form images on recording medium such as paper based on image data, and a facsimile transmitting and receiving function to transmit and receive facsimile data. Incidentally, the MFPs 10a to MFP10c have similar functions so that unless particular one is specified, they are referred to simply as the MFP 10 respectively.

The communication medium 3 constitutes, for example, a local area network which may be wired or wireless. Also, the communication medium 3 is connected to a wide area network such as the Internet. Incidentally, the communication medium 3 may constitute a public switched telephone networks in place of a wide area network.

The information terminal 20 is a terminal which is implemented as a cellular phone to make telephone conversation available through a mobile telephone network by wirelessly communicating with a cellular phone base station. Also, the information terminal 20 is a terminal implemented with a wireless LAN capability.

The wireless station 30 is a relay device connected to the communication medium 3 and can be connected to the information terminal 20 having the wireless LAN capability. Meanwhile, the MFP 10 is capable of transmission and reception of data with the personal computer 12 through the communication medium 3, and capable of transmission and reception of data with the information terminal 20 through the communication medium 3 and the wireless station 30.

Incidentally, in the case where the MFP 10 is implemented with a wireless LAN capability, the MFP 10 can transmit and receive data with the information terminal 20 without using the wireless station 30.

Figure 2:
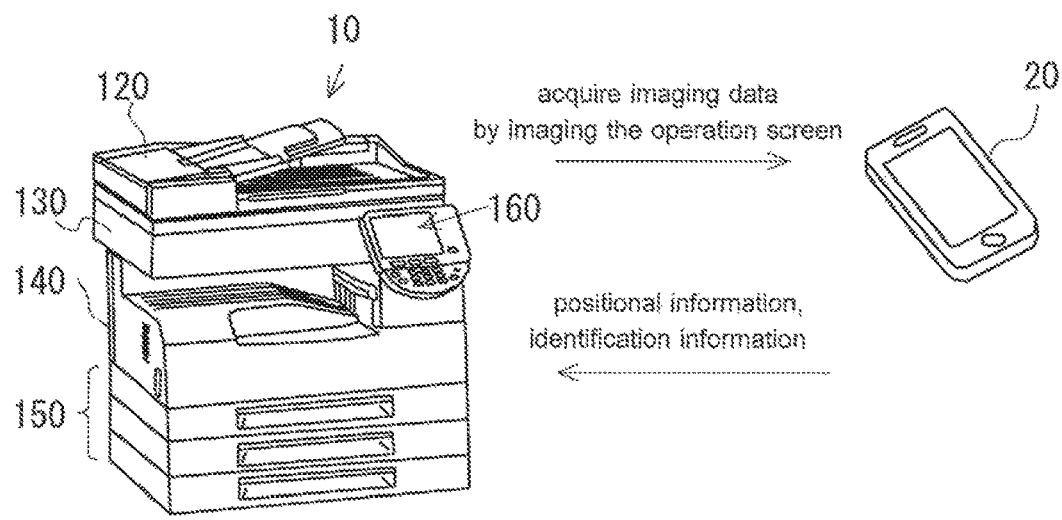
FIG. 2 is a schematic view for showing the situation in which an MFP 10 is remotely controlled by an information terminal 20.
Figure 3:
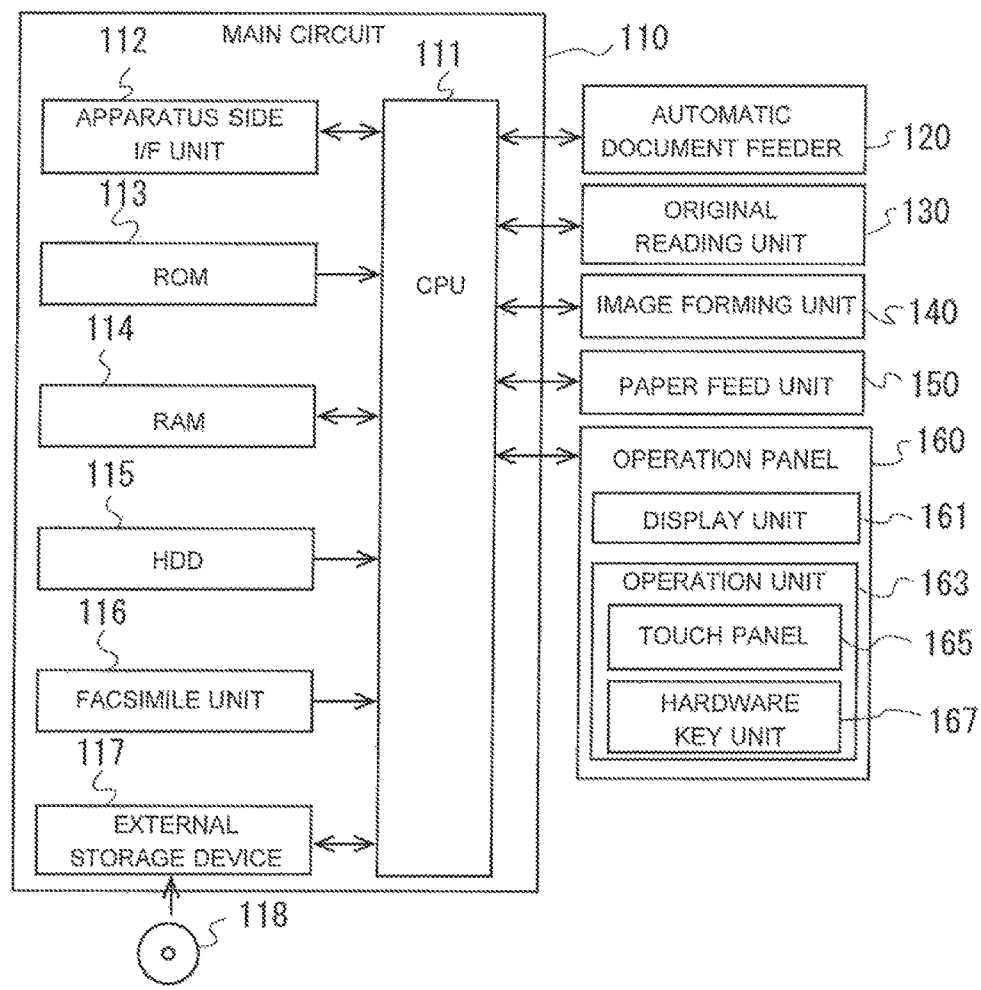
FIG. 3 is a block diagram for showing an example of the hardware configuration of the MFP 10.

Next, the general outline of the remote control of the MFP 10 by the information terminal 20 will be explained. FIG. 2 is a schematic view for showing the situation in which the MFP 10 is remotely controlled by the information terminal 20. FIG. 3 is a block diagram for showing an example of the hardware configuration of the MFP 10.

At first, the MFP 10 will be explained in detail. As shown in FIGS. 2 and 3, the MFP 10 includes a main circuit 110, an automatic document feeder 120, an original reading unit 130, an image forming unit 140, a paper feed unit 150 and an operation panel 160. The automatic document feeder 120 conveys an original to the original reading unit 130. The original reading unit 130 reads the original conveyed by the automatic document feeder 120. The image forming unit 140 forms an image on a recording medium such as paper based on the image data of the original read by the original reading unit 130. The paper feed unit 150 supplies a recording medium such as paper to the image forming unit 140.

The operation panel 160 is located on the top of the MFP 10 and includes a display unit 161 and an operation unit 163. The display unit 161 is a display device which is, for example, a liquid crystal display device. The display unit 161 displays a command menu to a user, information about the image data of the original read by the original reading unit 130, and so forth.

The operation unit 163 accepts a command input by user's operation. The operation unit 163 includes a hardware key unit 167. The hardware key unit 167 consists of a plurality of keys. The plurality of keys are used to input a variety of commands, characters, numerals and the like data. The operation unit 163 includes a touch panel 165. The touch panel 165 is located on the top of the display unit 161 to detect the coordinates of a position which is touched of the display screen of the display unit 161.

The main circuit 110 includes a CPU 111, a apparatus side interface unit 112, a ROM 113, a RAM 114, an HDD 115, a facsimile unit 116, and an external storage device 117. The CPU 111 is connected to the automatic document feeder 120, the original reading unit 130, the image forming unit 140, the paper feed unit 150 and the operation panel 160 to control the entirety of the MFP 10.

The apparatus side interface unit 112 is an interface through which the MFP 10 is connected to the communication medium 3. Accordingly, the CPU 111 performs transmission and reception of a variety of data by communicating with the MFPs 10a to 10c or the information terminal 20 through the apparatus side interface unit 112. The apparatus side interface unit 112 is capable of communicating with a various types of apparatuses which are connected to the Internet through the communication medium 3.

The ROM 113 stores a program which is run by the CPU 111 and data which is needed to run the program. The RAM 114 provides a work area on which the CPU 111 runs the program. Also, the RAM 114 is used to temporarily store image data which is continuously transmitted from the original reading unit 130.

The facsimile unit 116 is connected to a public switched telephone network (PSTN). The facsimile unit 116 transmits facsimile data to the public switched telephone network. The facsimile unit 116 receives facsimile data from the public switched telephone network. The facsimile unit 116 stores the received facsimile data in the HDD 115 or outputs the facsimile data to the image forming unit 140.

Accordingly, the image forming unit 140 can print the facsimile data received by the facsimile unit 116 on a sheet. The facsimile unit 116 converts data stored in the HDD 115 to facsimile data, and transmits the facsimile data to a facsimile machine which is connected to the public switched telephone network but not shown in the figure. Incidentally, the HDD 115 serves as a mass storage device which comprises, for example, a hard disk drive.

The external storage device 117 receives a CD-ROM 118. The CPU 111 can thereby access the CD-ROM 118 through the external storage device 117. The CPU 111 loads, on the RAM 114, a program stored in the CD-ROM 118 mounted on the external storage device 117, and run the program.

Meanwhile, in the image forming system 1, an arbitrary protocol can be used as a protocol for transmitting and receiving data between the MFP 10 and the information terminal 20 as long as the data transmitting end can be identified at the data receiving end. The protocol for transmitting and receiving data may be, for example, HTTP (Hyper Text Transfer Protocol), FTP (File Transfer Protocol), SMPT (Simple Mail Transfer Protocol) and POP (Post Office Protocol).

Figure 4:
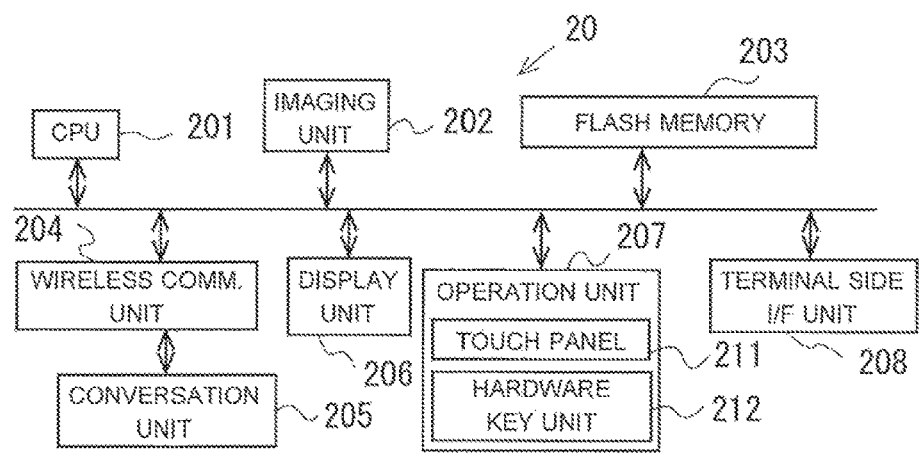
FIG. 4 is a block diagram for showing an example of the hardware configuration of the information terminal 20.

Next, the information terminal 20 will be explained in detail. FIG. 4 is a block diagram for showing an example of the hardware configuration of the information terminal 20. As shown in FIG. 4, the information terminal 20 includes a CPU 201, an imaging unit 202, a flash memory 203, a wireless communication unit 204, a voice conversation unit 205, a display unit 206, an operation unit 207 and a terminal side interface unit 208.

The imaging unit 202 consists of a lens and a photoelectric conversion device, and light condensed by the lens is imaged on the photoelectric conversion device. The photoelectric conversion device consists, for example, of CMOS (Complementary Metal Oxide Semiconductor) sensor, and outputs image data obtained by photoelectrically converting received light to the CPU 201 or the flash memory 203 as imaging data.

The flash memory 203 stores a program which is run by the CPU 201 and data which is needed to run the program. The CPU 201 runs the program stored in the flash memory 203 after loading the program on a RAM which is incorporated in the CPU 201 but not shown in the figure.

The wireless communication unit 204 performs wireless communication with a cellular phone base station connected to a telephone communication network. The wireless communication unit 204 connects the information terminal 20 with the telephone communication network to make telephone conversation available with the voice conversation unit 205. The wireless communication unit 204 demodulates a radio frequency signal received from a cellular phone base station to a voice signal. The wireless communication unit 204 decodes and outputs the demodulated voice signal to the voice conversation unit 205.

The wireless communication unit 204 encodes voice input from the voice conversation unit 205, and transmits the encoded signal to a cellular phone base station. The voice conversation unit 205 incorporates a microphone and a speaker. The speaker outputs voice which is input from the wireless communication unit 204. The microphone outputs input voice to the wireless communication unit 204. The wireless communication unit 204 is controlled by the CPU 201, and connects the information terminal 20 with an email server to transmit and receive email.

The display unit 206 is a display device which is, for example, a liquid crystal display device. The display unit 206 displays a command menu to a user. The display unit 206 displays information about image data acquired by the imaging unit 202 or the terminal side interface unit 208. Namely, the display unit 206 includes a function of a display device. It means that the display unit 206 corresponds to a display device.

The operation unit 207 accepts instructions provided by user's operation. The operation unit 207 includes a hardware key unit 212. The hardware key unit 212 consists of a plurality of keys. The plurality of keys are used to input a variety of commands, characters, numerals and the like data. The operation unit 207 includes a touch panel 211. The touch panel 211 is located on the top of the display unit 206 to detect the coordinates of a position which is touched of the display screen of the display unit 206. Namely, the operation unit 207 includes a function of an operation device. It means that the operation unit 207 corresponds to an operation device.

The terminal side interface unit 208 is an interface through which the information terminal 20 communicates with the wireless station 30 to connect to the communication medium 3. Namely, the terminal side interface unit 208 includes a function of a terminal side interface. It means that the terminal side interface unit 208 corresponds to a terminal side interface. The information terminal 20 can communicate with each of the MFPs 10a to 10c by registering the IP (Internet Protocol) address of each of the MFPs 10a to 10c in the information terminal 20 in advance to make it possible to transmit and receive data therebetween.

In this case, when an operation screen is displayed on the display unit 161 of the MFP 10, the displayed operation screen can be imaged by the imaging unit 202 of the information terminal 20. The information terminal 20 can acquire the imaging data of the operation screen displayed on the display unit 161 of the MFP 10 by imaging the operation screen with the imaging unit 202.

Furthermore, when displaying the imaging data of the operation screen on the display unit 206 as the display screen, the information terminal 20 can accept operation content of the display screen through the operation unit 207. The operation content of the display screen corresponds to positional information.

Incidentally, the display unit 161 of the MFP 10 can display a plurality of operation screens. Accordingly, the MFP 10 can be remotely controlled with the imaging data of an operation screen by acquiring identification information for identifying which of a plurality of operation screens is displayed on the display unit 206 of the information terminal 20 as the display screen, and transmitting the positional information and the identification information from the information terminal 20 to the MFP 10 as illustrated in FIG. 2.

Figure 5:
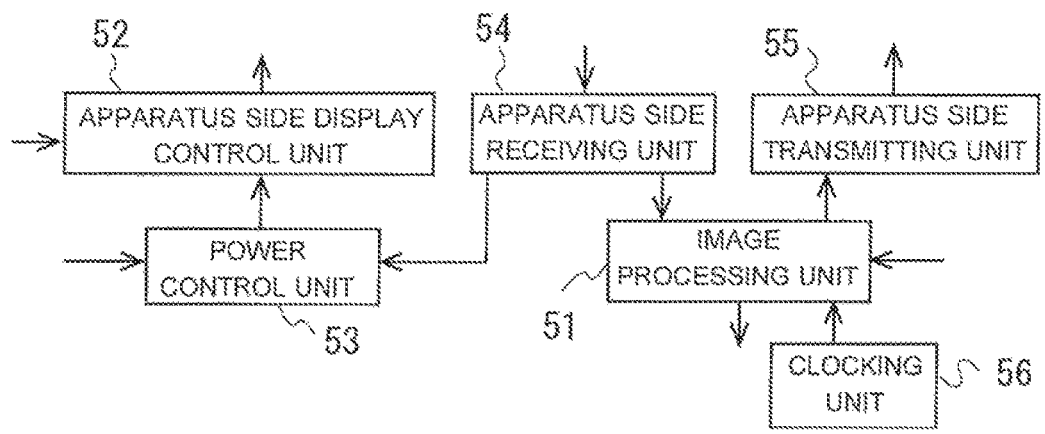
FIG. 5 is a block diagram for showing an example of the functional configuration of the MFP 10.
Figure 6:
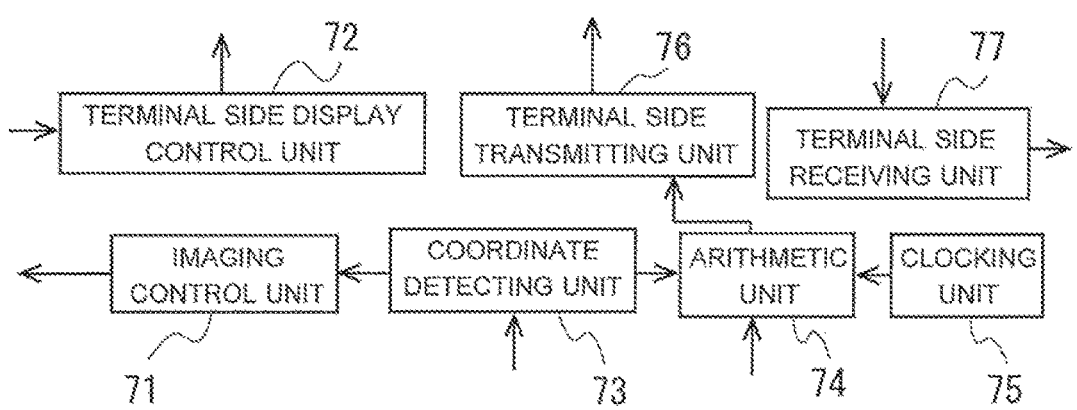
FIG. 6 is a block diagram for showing an example of the functional configuration of the information terminal 20.

Next is a description of the functional configuration applicable when the MFP 10 is remotely controlled by the information terminal 20. FIG. 5 is a block diagram for showing an example of the functional configuration of the MFP 10. FIG. 6 is a block diagram for showing an example of the functional configuration of the information terminal 20.

The CPU 111 runs a variety of programs stored in the ROM 113, the HDD 115 or the CD-ROM 118 to realize a variety of functions including an image processing unit 51, an apparatus side display control unit 52, a power control unit 53, an apparatus side receiving unit 54, an apparatus side transmitting unit 55 and a clocking unit 56 and so forth.

The image processing unit 51 outputs image formation commands to the image forming unit 140 in response to various commands. The image processing unit 51 performs processes relating to an image based on operation signals received by the apparatus side receiving unit 54. The operation signals are transmitted from the information terminal 20 which can be a subject of the remote control. For example, when the display screen displayed on the information terminal 20 is operated, an operation signal is generated and transmitted to the MFP 10 to be remotely controlled.

When performing a process relating to an image, in response to the reception of an operation signal, the image processing unit 51 associates operation content operated through the display screen with operation content which can be operated through the operation screen based on screen identification information and operation item positional information contained in the operation signal.

If the display screen includes an image of a hardware key B which corresponds to the operation content operated through the display screen, the image processing unit 51 performs the process of an image corresponding to the hardware key B. For example, if the process corresponding to the hardware key B is a process of scanning an image based on a preset configuration, the image processing unit 51 performs this corresponding process. Specifically, based on screen identification information and operation item positional information, the image processing unit 51 can determine which of the touch panel 165 and the hardware key unit 167 the operation content operated through the display screen corresponds to. The image processing unit 51 can thereby identify which hardware key is operated with reference to a positional correspondence table which is preset to determine the position of each key of the hardware key unit 167. Incidentally, the position of each key in the positional correspondence table can be represented by either absolute coordinates or relative coordinates.

On the other hand, if the operation screen is switched from a first setting screen to a second setting screen, the operation content is dynamically switched in response to the switch from the first setting screen to the second setting screen. In this case, if this switching scene is imaged by the information terminal 20 as a moving image, this moving image can be played back with the information terminal 20. For example, the moving image of switching from the first setting screen to the second setting screen is displayed on the display unit 206 of the information terminal 20, and if an operation item of the second setting screen is operated after the second setting screen is displayed, the operation signal corresponding to this operation item is transmitted to the MFP 10. Also in this case, the image processing unit 51 is responsible to associate operation content which can be operated through the display screen with operation content which can be performed through the operation screen based on screen identification information and operation item positional information contained in the operation signal.

The apparatus side display control unit 52 displays one of a plurality of operation screens stored in the HDD 115 on the display unit 161. The plurality of operation screens are associated with each other and include operation items for switching from one operation screen to another operation screen. When operation of selecting an operation item is detected by the operation unit 163, the apparatus side display control unit 52 reads the operation screen associated with the selected operation item from the HDD 115 and displays the operation screen on the display unit 161.

Namely, the operation of a process relating to an image is accepted through the operation screen. The apparatus side display control unit 52 therefore controls the display of the operation screen.

The power control unit 53 controls the electric power required for displaying the operation screen. The power control unit 53 switches the power supply state for displaying the operation screen from a normal state to a stand-by state when the operation screen is imaged.

The apparatus side receiving unit 54 receives the operation signal corresponding to operation content which can be operated through the operation screen which is displayed under the control by the apparatus side display control unit 52. The operation signal is transmitted from the information terminal 20 which can be a subject of the remote control. For example, when the display screen displayed on the information terminal 20 is operated, an operation signal is generated and transmitted to the MFP 10 to be remotely controlled, and the apparatus side receiving unit 54 receives the operation signal through the apparatus side interface unit 112.

When receiving the notification that the operation screen displayed on the display unit 161 is imaged, the apparatus side receiving unit 54 notifies the power control unit 53 of this fact.

The apparatus side transmitting unit 55 transmits various signals to the information terminal 20 and the like through the apparatus side interface unit 112.

The clocking unit 56 counts time according to a timezone which is set in advance, and the count result is output to the image processing unit 51 with a predetermined timing. Incidentally, the clocking unit 56 is responsible to count time based on a predetermined reference. For example, the clocking unit 56 can count time with reference to the standard frequency broadcast.

The CPU 201 runs various programs stored in the flash memory 203 and the like in order to implement various functions including an imaging control unit 71, a terminal side display control unit 72, a coordinate detecting unit 73, an arithmetic unit 74, a clocking unit 75, a terminal side transmitting unit 76 and a terminal side receiving unit 77 as illustrated in FIG. 6.

The imaging control unit 71 has the imaging unit 202 take an image of a subject by outputting a control command to the imaging unit 202 in accordance with the operation content of the operation unit 207. In the case where the subject is the operation screen displayed on the display unit 161 of the MFP 10, the imaging unit 202 images the operation screen in response to the control command of the imaging control unit 71. Namely, the imaging unit 202 has a function of an imaging device. It means that imaging unit 202 corresponds to an imaging device.

The terminal side display control unit 72 displays data stored in the flash memory 203 on the display unit 206. In the case where the flash memory 203 stores imaging data of the operation screen displayed on the display unit 161 of the MFP 10, when this imaging data is selected, the terminal side display control unit 72 outputs a control command to the display unit 206 to display the display screen based on the imaging data. The display unit 206 acquires the imaging data in response to the control command of the terminal side display control unit 72, and display the display screen based on the operation screen.

When the operation unit 207 accepts operation content of the display screen displayed on the display unit 206, the coordinate detecting unit 73 detects positional information where the operation unit 207 is operated as coordinate information. For example, when a plurality of operation items are displayed on the display screen and one of the plurality of operation items is operated, the coordinate detecting unit 73 detects the positional information of the operation item, which is operated, as coordinate information.

The arithmetic unit 74 generates an operation signal based on the operation content operated through the display screen of the imaging data obtained by imaging the operation screen. The operation content operated through the display screen is, firstly, operation item positional information which associates the operation item of the operation screen with the operation item of the display screen. The operation content operated through the display screen is, secondly, screen identification information which associates the operation screen with the display screen.

The operation item positional information is generated based on the coordinate information of the operation item displayed on the display screen. For example, the operation items in the display screen include items corresponding to operation commands of copy, scan and facsimile. If the item corresponding to the copy command is selected, information containing coordinate information corresponding to the selected position is generated as operation item positional information.

The operation item positional information is corrected if there is a misalignment between the display screen and the operation screen. Specifically, the operation item positional information is corrected in accordance with the misalignment amount between the display screen and the operation screen. The misalignment amount is obtained, for example, based on the view angle at which the imaging unit 202 images the operation screen displayed on the display unit 161 of the MFP 10. Since the view angle is set in the imaging unit 202 in advance of imaging, the arithmetic unit 74 calculates the misalignment amount based on the view angle which is set in the imaging unit 202, and obtains a one-to-one correspondence between the operation items of the operation screen and the operation items of the display screen.

Also, the misalignment amount is obtained based on the coordinate information of the operation items of the operation screen and the coordinate information of the operation items of the display screen with reference to contour information of the operation screen. The contour information of the operation screen is boundary information indicative of the area in which operation is possible in the operation screen. The misalignment amount between the operation items of the display screen and the operation items of the operation screen can thereby be obtained by acquiring the contour information of the operation screen.

Also, if a misalignment occurs due to the imaging magnification of the operation screen or the displaying magnification of the display screen, the misalignment amount is corrected based on the magnification. For example, if the display screen is displayed as 300% of the operation screen, the coordinate information of the operation items of the display screen does not correspond to the coordinate information of the operation items of the operation screen. In this case, if the misalignment amount is corrected based on the displaying magnification, it is possible to associate the operation items of the display screen with the operation items of the operation screen. Namely, if a misalignment occurs due to a relative misalignment between the display screen and the operation screen, the misalignment amount is corrected based on the relative misalignment.

Incidentally, a practical method of calculating the misalignment amount as described above could easily be conceived by those skilled in the art, and therefore a detailed description will be dispensed with in this specification. For example, the misalignment amount may be calculated by defining the display screen and the operation screen on an affine space respectively and establishing an affine map between the display screen and the operation screen.

If the operation screen and the display screen include the screen identification information respectively, the included screen identification information is utilized. For example, in the case where the operation screen includes a serial number and where the display screen includes a serial number respectively as a common identifier A, if these serial numbers are equal, this number may be used as screen identification information.

Also, if predetermined mapping relation is constituted between the number included in the operation screen and the number included in the display screen, these numbers may be used as screen identification information. For example, even in the case where the number included in the display screen is the number included in the operation screen plus a predetermined value, the operation screen and the display screen can be associated with each other.

Also, in the case where a correspondence relation holds between a symbol included in the display screen and a symbol included in the operation screen, these symbols may be used as screen identification information.

Namely, if a correspondence relation holds between an identifier A included in the display screen and an identifier A included in the operation screen, the identifiers A may be used as screen identification information. Extraction of the identifiers A can easily be implemented by those skilled in the art so that a detailed description is dispensed with. For example, in the case where the identifiers A are provided in a correspondence table, when the display unit 206 displays the display screen, it is detected whether or not there is the identifier A of the display screen in the correspondence table by pattern matching. The screen identification information may be detected, for example, by obtaining the similarity degree between the identifier A of the display screen and the identifier A of the operation screen in accordance with a template matching method, and determining whether or not these identifiers are recognized as equal to each other.

Meanwhile, if there is no identifier A available for associating the operation screen with the display screen, a new identifier A may be generated to associate the operation screen with the display screen. Specifically, when the operation screen is imaged, the time when imaging the operation screen may be generated as screen identification information. In this case, the display screen and the operation screen can be associated with each other by storing the time when displaying the operation screen, with predetermined timings in the MFP 10.

The clocking unit 75 counts time in accordance with a timezone which is set in advance, and outputs the count result to the arithmetic unit 74 with a predetermined timing. Meanwhile, the clocking unit 75 is responsible to count time based on a predetermined reference. For example, the clocking unit 75 can count time with reference to the standard frequency broadcast.

The terminal side transmitting unit 76 transmits an operation signal which is generated by the arithmetic unit 74. For example, the terminal side transmitting unit 76 transmits an operation signal to the MFP 10 through the terminal side interface unit 208.

The terminal side receiving unit 77 receives various signals through the terminal side interface unit 208. For example, the terminal side receiving unit 77 receives, through the terminal side interface unit 208, various signals which are transmitted from the MFP 10.

Incidentally, it is assumed that the clocking unit 56 and the clocking unit 75 are set up based on the same timezone. However, if these clocking units are set up based on different timezones, either one clocking unit is adjusted in accordance with the time difference therebetween.

Figure 7:
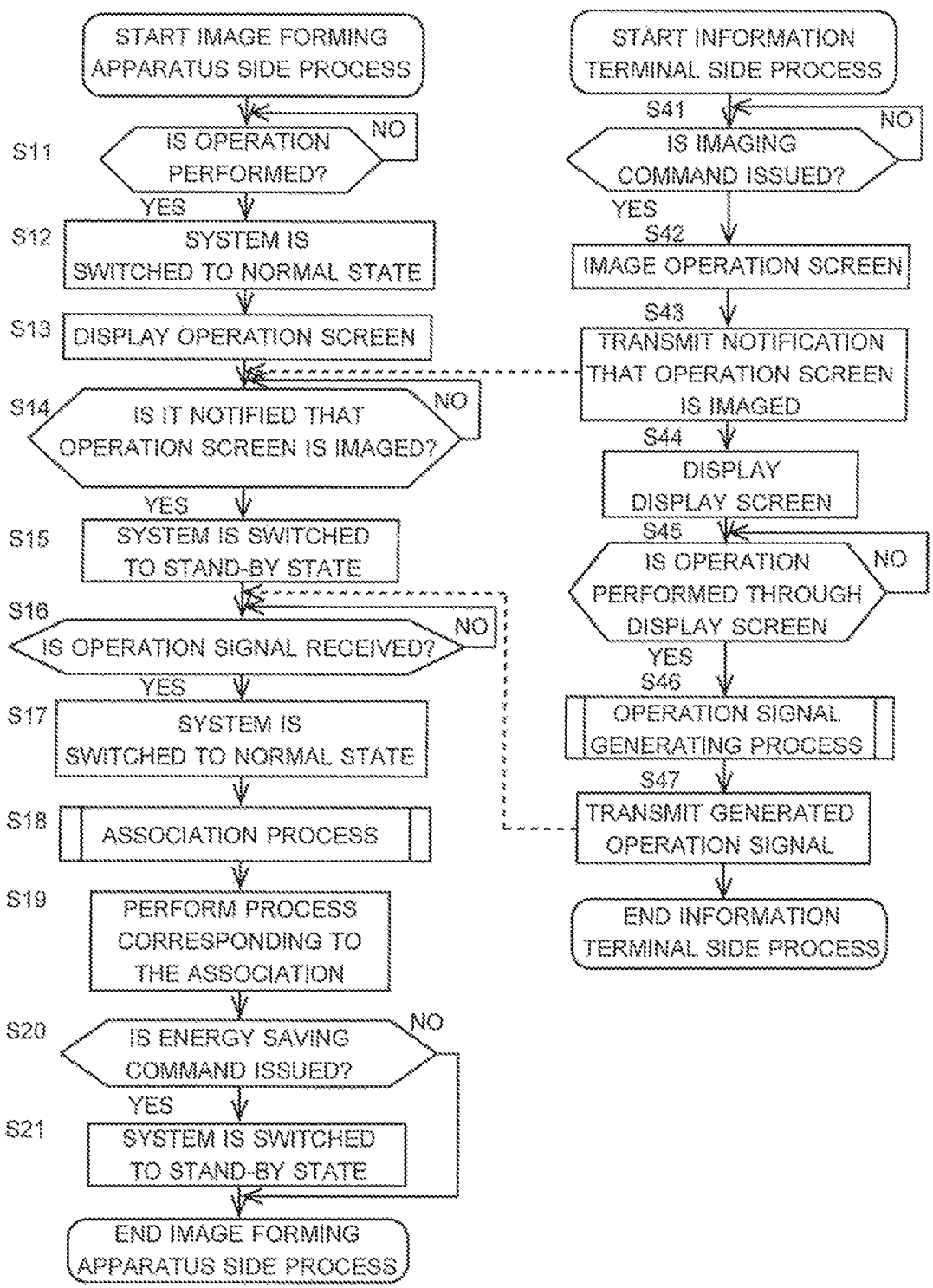
FIG. 7 is a flow chart for showing an example of controlling the image forming system 1.
Figure 8:
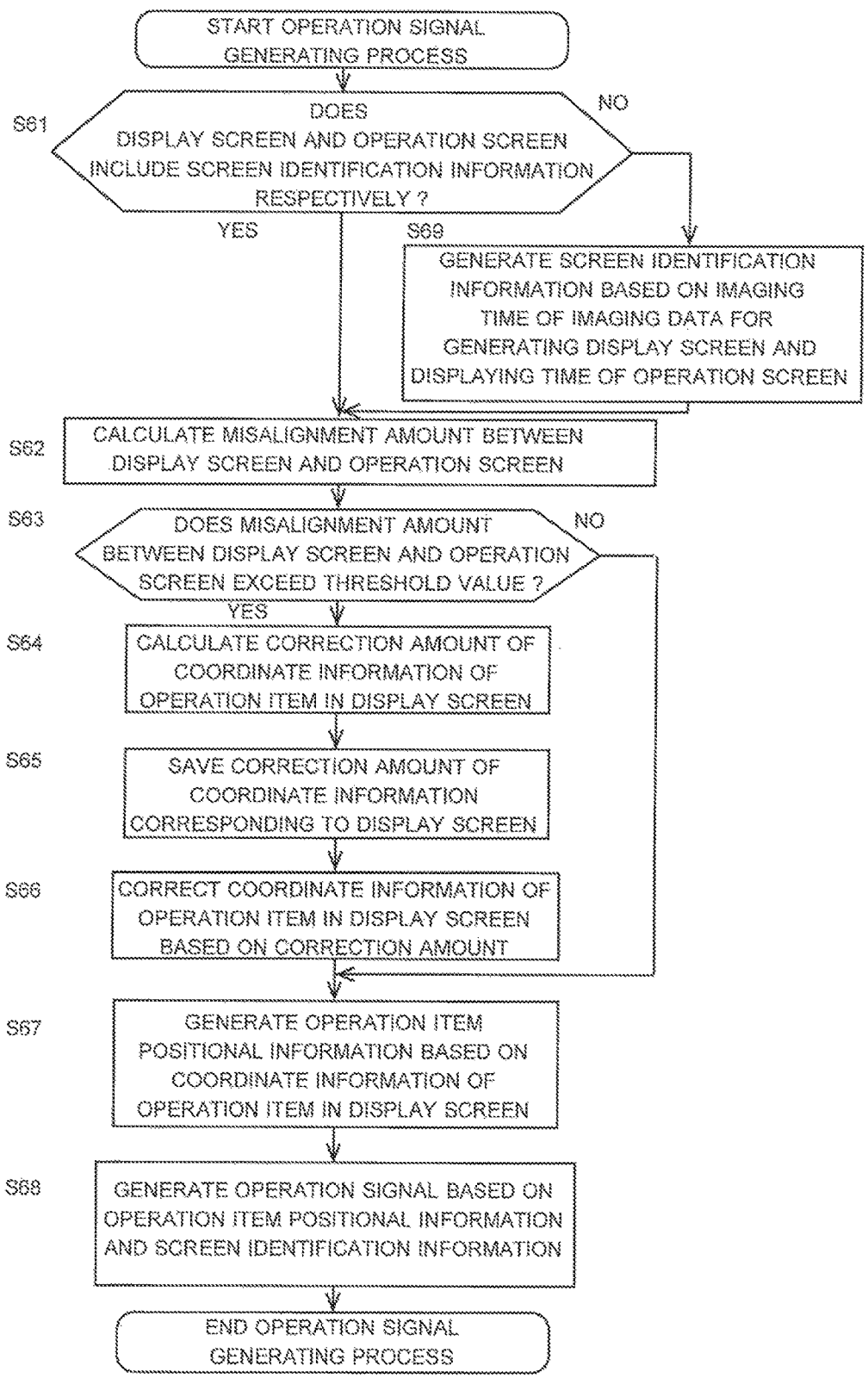
FIG. 8 is a flow chart for explaining an operation signal generating process in detail.
Figure 9:
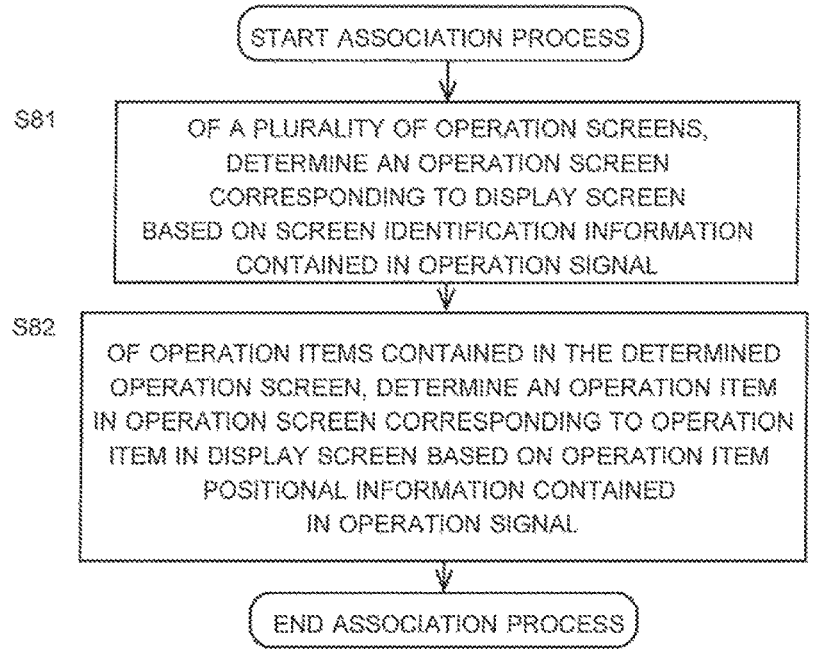
FIG. 9 is a flow chart for explaining an association process in detail.
Figure 10:
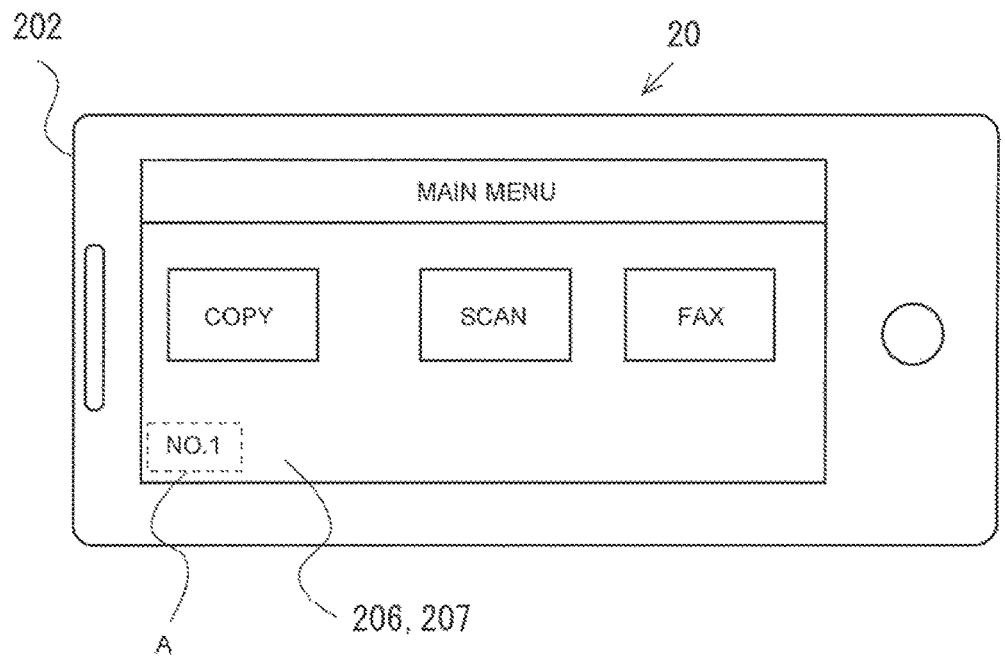
FIG. 10 is a view for showing an example of the display screen displayed on a display unit 206 of the information terminal 20 and including an identifier A.

Next, a series of steps of the above explained process will be explained. FIG. 7 is a flow chart for showing an example of controlling the image forming system 1. FIG. 8 is a flow chart for explaining an operation signal generating process in detail. FIG. 9 is a flow chart for explaining an association process in detail. FIG. 10 is a view for showing an example of the display screen displayed on the display unit 206 of the information terminal 20 and including an identifier A. FIG. 11 is a view for showing an example of the display screen displayed on the display unit 206 of the information terminal 20 and including items corresponding to hardware keys B.

Incidentally, the MFP 10 functioning as an image forming apparatus is in a stand-by state and an energy saving mode.

(Image Forming Apparatus Side Process)

(Step S11) The CPU 111 determines whether or not operation is performed. If operation is performed, the process proceeds to step S12. Conversely, if operation is not performed, step S11 is repeated.

(Step S12) The CPU 111 switches the state of the MFP 10 from the stand-by state to the normal state. The MFP 10 is thereby released from the energy saving mode.

(Step S13) The CPU 111 displays the operation screen on the display unit 161. The MFP 10 is then in a state in which operation can be accepted by the operation unit 163 through the operation screen.

(Step S14) The CPU 111 determines whether or not it is notified that the operation screen is imaged. If it is notified that the operation screen is imaged, the process proceeds to step S15. Conversely, if it is not notified that the operation screen is imaged, step S14 is repeated.

(Step S15) The CPU 111 switches the state of the MFP 10 from the normal state to the stand-by state. The MFP 10 enters the energy saving mode.

(Step S16) The CPU 111 determines whether or not an operation signal is received. If an operation signal is received, the process proceeds to step S17. Conversely, if no operation signal is received, step S16 is repeated.

(Step S17) The CPU 111 switches the state of the MFP 10 from the stand-by state to the normal state. The MFP 10 is thereby released from the energy saving mode.

(Step S18) The CPU 111 performs an association process. Meanwhile, the details of the association process will be described later.

(Step S19) The CPU 111 performs the process corresponding to the operation content which is associated. For example, when the operation item of copy is operated of the display screen displayed on the display unit 206 of the information terminal 20 as illustrated in FIG. 10, the MFP 10 identifies the operation screen corresponding to identifier A shown in FIG. 10, and performs the process of the operation item of copy contained in the identified operation screen.

Incidentally, when the hardware key B of scan is operated as illustrated in FIG. 11, the MFP 10 performs the process corresponding to this hardware key B.

(Step S20) The CPU 111 determines whether or not an energy saving command is issued. If an energy saving command is issued, the process proceeds to step S21. Conversely, if an energy saving command is not issued, the process is terminated as it is.

The energy saving command may be issued by user's operation, or may be issued in accordance with a default setting in the MFP 10. The default setting is, for example, such that the MFP 10 enters the energy saving mode if no user's operation is performed even when a predetermined waiting time elapses. However, the default setting is not limited thereto.

(Step S21) The CPU 111 switches the state of the MFP 10 from the normal state to the stand-by state. The MFP 10 then enters the energy saving mode, and the process is terminated.

Incidentally, the termination of the process means the termination of the image forming apparatus side process as shown in FIG. 7, but does not mean that the operation of the MFP 10 is terminated.

(Information Terminal Side Process)

(Step S41) The CPU 201 determines whether or not an imaging command is issued. If an imaging command is issued, the process proceeds to step S42. Conversely, if no imaging command is issued, step S41 is repeated.

(Step S42) The imaging unit 202 is operated by the CPU 201 to image the operation screen which is displayed on the display unit 161 of the MFP 10.

(Step S43) The CPU 201 transmits the notification that the operation screen displayed on the display unit 161 of the MFP 10 is imaged to the MFP 10.

(Step S44) The CPU 201 displays the display screen on the display unit 206 as an imaging result of the imaging unit 202.

(Step S45) The CPU 201 determines whether or not operation is performed through the display screen. If operation is performed through the display screen, the process proceeds to step S46. Conversely, if operation is performed not through the display screen, step S45 is repeated.

(Step S46) The CPU 201 performs an operation signal generating process. The operation signal generating process will be described later.

(Step S47) The CPU 201 transmits the generated operation signal, and the process is terminated.

Incidentally, while the process is performed successively from step S41 through step S47, this embodiment is not limited thereto. For example, while the imaging process is performed, the process after step S44 is performed only when execution of the remote control is selected.

Incidentally, the termination of the process means the termination of the information terminal side process as shown in FIG. 7, but does not mean that the operation of the information terminal 20 is terminated.

(Operation Signal Generating Process)

(Step S61) The CPU 201 determines whether or not screen identification information is included in the display screen and the operation screen respectively. If screen identification information is included in the display screen and the operation screen respectively, the process proceeds to step S62. Conversely, if screen identification information is not included in either of the display screen and the operation screen, the process proceeds to step S69.

(Step S62) The CPU 201 calculates the misalignment amount between the display screen and the operation screen.

(Step S63) The CPU 201 determines whether or not the misalignment amount between the display screen and the operation screen exceeds a threshold value. If the misalignment amount between the display screen and the operation screen exceeds the threshold value, the process proceeds to step S64. Conversely, if the misalignment amount between the display screen and the operation screen does not exceed the threshold value, the process proceeds to step S67. The threshold value used herein is set up such that the misalignment amount between the display screen and the operation screen does not affect the association between the display screen and the operation screen. In other words, if the misalignment amount exceeds the threshold value, the misalignment amount between the display screen and the operation screen affects the association between the display screen and the operation screen.

(Step S64) The CPU 201 calculates the correction amount of the coordinate information of the operation item in the display screen.

(Step S65) The CPU 201 saves the correction amount of the coordinate information in correspondence with the display screen. For example, the display screen and the coordinate information are saved as a pair.

(Step S66) The CPU 201 corrects the coordinate information of the operation item in the display screen based on the correction amount.

(Step S67) The CPU 201 generates the operation item positional information based on the coordinate information of the operation item in the display screen.

(Step S68) The CPU 201 generates an operation signal based on the operation item positional information and the screen identification information, and the process is terminated.

(Step S69) The CPU 201 generates screen identification information based on the imaging time of imaging data for generating the display screen and the displaying time in the operation screen.

Incidentally, the termination of the process means the termination of the operation signal generating process as shown in FIG. 8, but does not mean that the operation of the information terminal 20 is terminated.

Also, the operation signal may be generated in an arbitrary format as long as it includes the operation item positional information and the screen identification information which can be extracted by the MFP 10.

(Association Process)

(Step S81) The CPU 111 determines one of a plurality of operation screens corresponding to the display screen based on the screen identification information contained in the operation signal.

(Step S82) The CPU 111 determines, of the operation items contained in the determined operation screen, an operation item in the operation screen corresponding to the operation item in the display screen based on the operation item positional information contained in the operation signal, and the process is terminated.

Incidentally, the termination of the process means the termination of the association process as shown in FIG. 9, but does not mean that the operation of the information terminal 20 is terminated.

As has been discussed above, the MFP 10 functioning as an image forming apparatus receives the operation signal based on the operation content operated through the display screen of the imaging data which is obtained by imaging the operation screen with the information terminal 20. The operation signal includes screen identification information which identifies the operation screen, and operation item positional information which identifies which of the operation items contained in the operation screen is operated. After receiving the operation signal, the image forming apparatus associates operation content which can be operated through the operation screen with the operation content operated through the display screen which is displayed on the information terminal 20.

The MFP 10 can thereby be remotely controlled without need for frequently communicating with the information terminal 20 as a subject of the remote control, and therefore the power consumption does not substantially increase during the remote control.

In other words, in accordance with the image forming apparatus, communication traffic and processing amount can be reduced to suppress power consumption by associating operation content operated on the display screen of the display screen with operation content which can be operated through the operation screen based on the operation content of the display screen of the imaging data obtained by imaging the operation screen, i.e., operation item positional information and screen identification information of the operation screen.

Also, in accordance with the image forming apparatus, the screen identification information is identifier A which is contained in the operation screen and the display screen respectively. Furthermore, the screen identification information may be generated based on the imaging time of imaging data and the displaying time of the operation screen. Accordingly, the operation screen can be identified in a simple and easy manner, and therefore communication traffic with the subject of the remote control and processing amount can be substantially reduced.

Furthermore, in accordance with the image forming apparatus, the operation item positional information is generated based on the coordinate information of the operation item contained in the display screen displayed on the display unit 206 of the information terminal 20. Accordingly, it is simply and easily identified which of the operation items contained in the operation screen is operated so that communication traffic with the subject of the remote control and processing amount can be substantially reduced.

Furthermore, in accordance with the image forming apparatus, the operation item positional information is corrected in accordance with the misalignment amount between the display screen displayed on the display unit 206 of the information terminal 20 and the operation screen displayed on the display unit 161 of the MFP 10. Accordingly, even when the imaging unit 202 does not face right in front of the operation screen, the misalignment amount is corrected during imaging with the imaging unit 202, and therefore the display screen and the operation screen can be accurately associated with each other to perform the remote control as expected.

Furthermore, in accordance with the image forming apparatus, the misalignment amount may be obtained based on the view angle of the imaging unit 202 of the information terminal 20 when imaging the operation screen displayed on the display unit 161 of the MFP 10. Accordingly, the remote control can be performed irrespective of the setting of the information terminal 20 when imaging.

Furthermore, in accordance with the image forming apparatus, the misalignment amount may be obtained, with reference to contour information of the operation screen displayed on the display unit 161 of the MFP 10, based on the coordinate information of the operation item contained in the operation screen displayed on the display unit 161 of the MFP 10 and the coordinate information of the operation item contained in the display screen displayed on the display unit 206 of the information terminal 20. Accordingly, the misalignment amount can be obtained with reference to contour information of the operation screen as the reference coordinate axes so that the position of the operation item can be accurately identified.

Furthermore, in accordance with the image forming apparatus, when misalignment occurs due to the imaging magnification of the operation screen displayed on the display unit 161 of the MFP 10, the misalignment amount is corrected based on this imaging magnification. Also, when misalignment occurs due to the displaying magnification of the display screen displayed on the display unit 206 of the information terminal 20, the misalignment amount is corrected based on this displaying magnification. Accordingly, since the misalignment amount is corrected based on the relative misalignment between the operation screen and the display screen, the remote control can be realized in an environment appropriate for user's preference.

Furthermore, in accordance with the image forming apparatus, when the display screen displayed on the display unit 206 of the information terminal 20 includes an item corresponding to the hardware key unit B of the MFP 10, the process corresponding to the hardware key unit B can be performed through the information terminal 20. Accordingly, since operations other than those viable through the touch panel 165 of the MFP 10 can be also remotely performed, the range of operations viable through the remote control can be expanded.

Furthermore, in accordance with the image forming apparatus, when the operation screen displayed on the display unit 161 of the MFP 10 is switched from a first setting screen to a second setting screen, an operation signal is generated based on a series of the operation item positional information and the screen identification information obtainable while the first setting screen is switched to the second setting screen. Accordingly, even if a setting screen switching scene is imaged as a motion image, the remote control can be performed also based thereon so that the remote control including the screen switching can be realized.

Furthermore, in accordance with the image forming apparatus, the power supply state for displaying the operation screen is switched from a normal state to a stand-by state when the operation screen displayed on the display unit 161 of the MFP 10 is imaged with the information terminal 20. Accordingly, the operation screen need not always be displayed so that the power consumption during the remote control can be substantially reduced.

Furthermore, in accordance with the image forming system 1, the remote control is realized by displaying, on the display unit 206, imaging data which is imaged with the imaging unit 202 of the information terminal 20, and performing a process in accordance with the operation content of the display screen displayed on the display unit 206. Accordingly, the remote control can be realized by the use of a terminal having a simple structure.

As has been discussed above, the image forming apparatus comprising: an image forming unit 140 that forms an image; and a processor configured to execute processes including: controlling a display of an operation screen for accepting operation of a process relating to an image; receiving an operation signal corresponding to first operation content which can be operated through the operation screen which is display controlled; and performing a process relating to the image based on the operation signal, wherein the operation signal is generated based on second operation content operated through a display screen of imaging data which is imaged of the operation screen, the second operation content includes operation item positional information which associates a first operation item of the operation screen with a second operation item of the display screen, and screen identification information which associates the operation screen with the display screen, and when performing the process relating to the image, the processor associates the first operation content with the second operation content based on the operation item positional information and the screen identification information in response to reception of the operation signal.

The image forming apparatus can thereby suppress power consumption during the remote control.

Furthermore, in accordance with the image forming apparatus of the present embodiment, the screen identification information is contained in the operation screen and the display screen respectively, or generated based on the imaging time of imaging data and the displaying time of the operation screen.

The communication traffic with the subject of the remote control and processing amount can thereby be substantially reduced.

Furthermore, in accordance with the image forming apparatus of the present embodiment, the operation item positional information is generated based on the coordinate information of the second operation item.

The communication traffic with the subject of the remote control and processing amount can thereby be substantially reduced.

Furthermore, in accordance with the image forming apparatus of the present embodiment, the operation item positional information is corrected in accordance with the misalignment amount between the display screen and the operation screen.

The display screen and the operation screen can thereby be accurately associated with each other to perform the remote control as expected with the image forming apparatus.

Furthermore, in accordance with the image forming apparatus of the present embodiment, the misalignment amount is obtained based on the view angle when imaging the operation screen.

The remote control of the image forming apparatus can thereby be performed irrespective of the setting of the information terminal 20 when imaging.

Furthermore, in accordance with the image forming apparatus of the present embodiment, the misalignment amount is obtained based on the coordinate information of the first operation items and the coordinate information of the second operation items with reference to contour information of the operation screen.

The position of the operation item can thereby be accurately identified in the image forming apparatus.

Furthermore, in accordance with the image forming apparatus of the present embodiment, when misalignment occurs due to the imaging magnification of the operation screen, the misalignment amount is corrected based on this imaging magnification. Also, when misalignment occurs due to the displaying magnification of the display screen, the misalignment amount is corrected based on this displaying magnification.

The remote control of the image forming apparatus can thereby be realized in an environment appropriate for user's preference.

Furthermore, in accordance with the image forming apparatus of the present embodiment, when the display screen includes an image of a hardware key B which corresponds to the second operation content, the processor performs the process of an image corresponding to the hardware key B.

The range of operations viable through the remote control of the image forming apparatus can thereby be expanded.

Furthermore, in accordance with the image forming apparatus of the present embodiment, when the operation screen is switched from a first setting screen to a second setting screen, the second operation content includes a series of the operation item positional information and the screen identification information obtainable while the first setting screen is switched to the second setting screen.

The remote control of the image forming apparatus including the screen switching can thereby be realized.

Furthermore, in accordance with the image forming apparatus of the present embodiment, the processor further controls the electric power required for displaying the operation screen, and switches the power supply state for displaying the operation screen from a normal state to a stand-by state when the operation screen is imaged.

The power consumption during the remote control of the image forming apparatus can be substantially reduced.

Furthermore, the image forming system 1 of the present embodiment comprises the image forming apparatus and the information terminal 20 which includes the imaging device configured to image the operation screen, the display configured to display the display screen based on the operation screen, the operation device configured to accept the second operation content of the display screen displayed on the display, and the terminal side interface configured to transmit an operation signal which is generated based on the second operation content.

In accordance with the image forming system 1, the remote control can be realized by the use of a terminal having a simple structure.

Furthermore, the program in accordance with the present embodiment makes a computer perform: controlling a display of an operation screen for accepting operation of a process relating to an image; receiving function to receive an operation signal corresponding to first operation content which can be operated through the operation screen which is display controlled; and performing a process relating to the image based on the operation signal, wherein the operation signal is generated based on second operation content operated through a display screen of imaging data which is imaged of the operation screen, the second operation content includes operation item positional information which associates a first operation item of the operation screen with a second operation item of the display screen, and screen identification information which associates the operation screen with the display screen, and when performing the process relating to the image, associating the first operation content with the second operation content based on the operation item positional information and the screen identification information in response to reception of the operation signal.

It is therefore possible to suppress power consumption during the remote control in the same manner as in the image forming apparatus.

The image forming apparatus have been explained based on the embodiments in accordance with the present invention. However, it is not intended to limit the present invention to the precise form described, and obviously many modifications and variations are possible without departing from the scope of the invention.

For example, while the image forming system 1 of the above embodiment is explained with the MFP 10 functioning as an image forming apparatus with which a network is constructed, it is not limited thereto but any network element can be employed to construct the image forming system 1 as long as the network element functions as an image forming apparatus. For example, the network element may be a printer or a facsimile functioning as an image forming apparatus which construct the image forming system 1.

Furthermore, while the information terminal 20 of the above example is implemented with a cellular phone capability, the present invention is not limited thereto but the information terminal 20 may not be provided with a cellular phone capability as long as the imaging unit 202 is provided, as the imaging data imaged by the imaging unit 202 can be displayed, as the display screen including the imaging data can be operated, and as the operation content of the display screen can be transmitted to the MFP 10.

Furthermore, while the display units 161 and 206 are liquid crystal display devices respectively in the above example, the present invention is not limited thereto but an Organic ELD (Electro-Luminescence Display) can be used instead.

Furthermore, while the CD-ROM 118 is used as a recording medium for storing the program to be run by the CPU 111 in the above example, the present invention is not limited thereto but an optical disk, an IC card, an optical card, or a semiconductor memory such as a mask ROM, an EPROM (Erasable Programmable ROM) and an EEPROM (Electrically EPROM) can be used instead.

Furthermore, while the program to be run by the CPU 111 is stored in the CD-ROM 118 in the above example, the present invention is not limited thereto but the program to be run by the CPU 111 may be stored in the HDD 115, and loaded to the RAM 114 for execution. In this case, another computer connected to the communication medium 3 and not shown in the figure can rewrite the program stored in the HDD 115 of the MFP 10 or add a new program to the HDD 115. Furthermore, the MFP 10 can be structured to download a program from another computer connected to the communication medium 3 and not shown in the figure and store the downloaded program in the HDD 115. Such programs include not only programs which can be directly run by the CPU 111 but also programs in the forms of source programs, compressed programs, encoded programs and so forth.

Furthermore, while the flash memory 203 is used as a recording medium for storing the program to be run by the CPU 201 in the above example, the present invention is not limited thereto but an optical disk, an IC card, an optical card, or a semiconductor memory such as a mask ROM, an EPROM (Erasable Programmable ROM) and an EEPROM (Electrically EPROM) can be used instead.

In this case, another computer connected to the communication medium 3 and not shown in the figure can rewrite the program stored in the flash memory 203 of the information terminal 20 or add a new program to the flash memory 203. Furthermore, the information terminal 20 can be structured to download a program from another computer connected to the communication medium 3 and not shown in the figure and store the downloaded program in the flash memory 203. Such programs include not only programs which can be directly run by the CPU 201 but also programs in the forms of source programs, compressed programs, encoded programs and so forth.

Furthermore, while a CMOS sensor is used as the photoelectric conversion device constituting the imaging unit 202 of the information terminal 20 in the above example, the present invention is not limited thereto but a CCD (Charge Coupled Device) sensor can be used instead.

Furthermore, while the information terminal 20 is capable of communicating with the MFPs 10a to 10c through the terminal side interface unit 208 respectively in the above example, the present invention is not limited thereto but another communication configuration can be used instead. For example, in the case where the information terminals 20 and the MFPs 10a to 10c incorporate short range wireless communication functionality such as Bluetooth (registered trademark), the information terminal 20 may communicate with some of the MFPs 10a to 10c through a point-to-point connection. Alternatively, the information terminal 20 may be wired connected to some of the MFPs 10a to 10c through a USB (Universal Serial Bus) cable or the like to communicate with some of the MFPs 10a to 10c through a point-to-point connection.

Incidentally, although explanation is dispensed with in the case of the present embodiment, an authentication process may be performed by the use of a password or the like in advance of starting communication between the information terminal 20 and the MFP 10, and communication between the information terminal 20 and the MFP 10 is established when the communication is permitted through the authentication.

Meanwhile, the series of processes as described above may be performed by hardware or software. In the case where the series of processes are performed by software, various programs of the software are installed in a computer which can realize the above functions by running the various programs, and the various programs can be installed by reading them from a recording medium or downloading them from the Internet.

What is claimed is:

1. An image forming apparatus comprising:
an image forming unit that forms an image; and
a processor configured to execute processes including:
controlling a display of an operation screen for accepting an operation of a process relating to an image;
receiving an operation signal corresponding to a first operation content which can be operated on the operation screen; and
performing a process relating to the image based on the operation signal, wherein
the operation signal is generated based on a second operation content operated on a display screen of image data which is an image of the operation screen,
the second operation content includes operation item positional information which associates a first operation item of the operation screen with a second operation item of the display screen, and screen identification information which associates the operation screen with the display screen, and
when performing the process relating to the image, an identifier is contained in each of the operation screen and the display screen as the screen identification information triggered by reception of the operation signal and when the identifier contained in the operation screen matches the identifier contained in the display screen, the processor associates the first operation content with the second operation content based on the operation item positional information and the screen identification information.

2. The image forming apparatus of claim 1 wherein when an identifier is not contained in each of the operation screen and the display screen, the screen identification information is contained in the operation screen and the display screen respectively, or generated based on the imaging time of imaging data and the displaying time of the operation screen.

3. The image forming apparatus of claim 2 wherein the operation item positional information is generated based on coordinate information of the second operation item.

4. The image forming apparatus of claim 3 wherein the operation item positional information is corrected in accordance with a misalignment amount between the display screen and the operation screen.

5. The image forming apparatus of claim 4 wherein the misalignment amount is obtained based on a view angle when imaging the operation screen.

6. The image forming apparatus of claim 4 wherein the misalignment amount is obtained based on coordinate information of the first operation item and the coordinate information of the second operation item with reference to contour information of the operation screen.

7. The image forming apparatus of claim 4 wherein when misalignment occurs due to imaging magnification of the operation screen, the misalignment amount is corrected based on this imaging magnification, and when misalignment occurs due to displaying magnification of the display screen, the misalignment amount is corrected based on this displaying magnification.

8. The image forming apparatus of claim 5 wherein when the display screen includes an image of a hardware key and the second operation content corresponds to the hardware key, the processor performs the process of an image corresponding to the hardware key.

9. The image forming apparatus of claim 8 wherein when the operation screen is switched from a first setting screen to a second setting screen, the second operation content includes a series of the operation item positional information and the screen identification information obtainable while the first setting screen is switched to the second setting screen.

10. The image forming apparatus of claim 1 wherein the processor further controls electric power required for displaying the operation screen and switches the power supply state for displaying the operation screen from a normal state to a stand-by state when the operation screen is imaged.

11. An image forming system comprising:
the image forming apparatus as recited in claim 1; and
an information terminal, wherein
the information terminal comprises:
an imaging device configured to image the operation screen;
a display configured to display the display screen based on the operation screen;
an operation device configured to accept the second operation content of the display screen displayed on the display; and
a terminal side interface configured to transmit the operation signal which is generated based on the second operation content.

12. A non-transitory computer readable medium on which is recorded a program which makes a computer perform:
controlling a display of an operation screen for accepting operation of a process relating to an image;
receiving an operation signal corresponding to a first operation content which can be operated through the operation screen; and
performing a process relating to the image based on the operation signal, wherein:
the operation signal is generated based on a second operation content operated on a display screen of image data which is an image of the operation screen,
the second operation content includes operation item positional information which associates a first operation item of the operation screen with a second operation item of the display screen, and screen identification information which associates the operation screen with the display screen, and
when performing the process relating to the image, an identifier is contained in each of the operation screen and the display screen as the screen identification information triggered by reception of the operation signal and when the identifier contained in the operation screen matches the identifier contained in the display screen, associating the first operation content with the second operation content based on the operation item positional information and the screen identification information in response to reception of the operation signal.

13. An image forming method comprising:
controlling a display of an operation screen for accepting an operation of a process relating to an image;
receiving an operation signal corresponding to a first operation content which can be operated through the operation screen; and
performing a process relating to the image based on the operation signal, wherein:
the operation signal is generated based on a second operation content operated on a display screen of image data which is an image of the operation screen,
the second operation content includes operation item positional information which associates a first operation item of the operation screen with a second operation item of the display screen, and screen identification information which associates the operation screen with the display screen, and
when performing the process relating to the image, an identifier is contained in each of the operation screen and the display screen as the screen identification information triggered by reception of the operation signal and when the identifier contained in the operation screen matches the identifier contained in the display screen, the processor associates the first operation content with the second operation content based on the operation item positional information and the screen identification information in response to reception of the operation signal.

* * * * *